Patented June 20, 1950

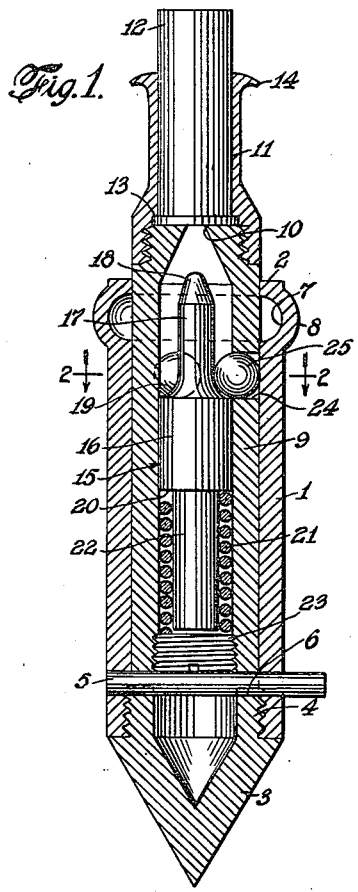
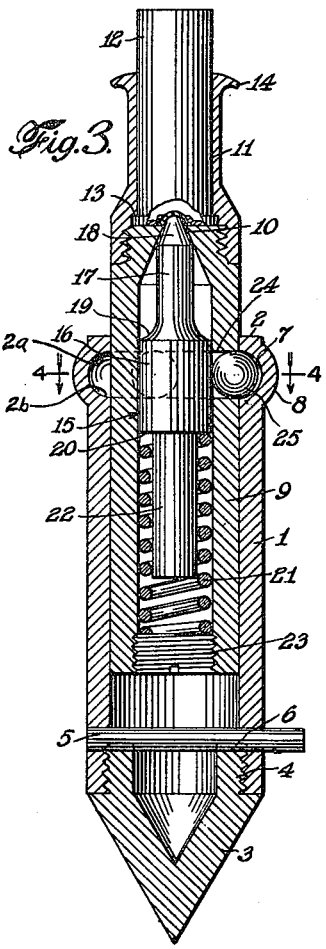
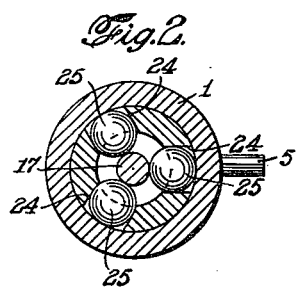
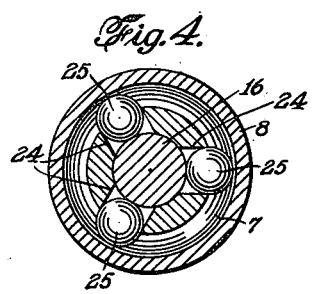
INVENTOR.
JOHN U. LEHN
BY
Robert E. Burns
ATTORNEY.

2,512,252

UNITED STATES PATENT OFFICE 2,512,252

CHEMICAL TRAP GUN

John U. Lehn, Lititz, Pa., assignor to Animal Trap Company of America, Lititz, Pa., a corporation of Pennsylvania Application June 2, 1944, Serial No. 538,439

5 Claims. (Cl. 43—84)

My invention consists in the novel features hereinafter described, reference being had to the accompanying drawing which illustrates one embodiment of the same, selected by me for purposes of illustration, and the said invention is fully disclosed in the following description and claims.

The present invention relates to trap guns for destroying certain predatory animals, for example, coyotes and wolves, by explosively discharging poison or other chemicals into the mouth of an animal springing the trap. The poison and the propellant charge are preferably contained in a cartridge somewhat similar to a gun cartridge, the trap being provided with a chamber into which the cartridge is inserted, a firing pin for discharging the cartridge, and trigger mechanism for releasing the firing pin. In use the trap is driven or buried in the ground with only a small part projecting to which the bait is attached. The bait holding portion is connected with the trigger mechanism in such manner that when the bait is seized by an animal the firing pin is released and discharges the cartridge in the cartridge chamber.

By reason of the traps being substantially buried in the ground and being subjected to the deleterious effect of dirt, rain, snow, ice, etc., they are required to operate under extremely adverse conditions. Moreover, in order to operate satisfactorily the traps must be sufficiently sensitive to be discharged quickly and surely when the bait is seized by an animal for which the trap is set, and must yet be entirely safe so that the trap will not be discharged accidentally by being stepped on or struck by cattle, sheep, horses or other animals. At the same time the trap guns must be sufficiently inexpensive that a trapper can afford to own and operate a long line of traps and must be sufficiently simple and fool-proof that they can be used and serviced by persons not having any great amount of mechanical skill.

It is an object of the present invention to provide a trap gun of simple construction that can be manufactured and sold at a low cost and yet be durable and reliable. Another object of my invention is to provide a trap gun which can be assembled easily and cheaply during manufacture and can also be easily disassembled and reassembled in the field without the use of tools other than the setting tool commonly supplied with such traps. By reason of this feature the traps, in accordance with my invention, can be quickly inspected, cleaned and serviced by an unskilled person even when working out on the trap line under adverse weather conditions. A further feature of my invention is that although the parts can be easily and quickly disassembled when desired, they are positively held against accidental separation in the operation or handling of the trap. A still further feature of my invention is to provide a trap which is particularly easy and safe to set and yet sensitive and positive in its operation.

Other objects and advantages of my invention will be understood from the following description of an embodiment of my invention shown by way of example in the accompanying drawings and from the appended claims.

In the drawings:

Fig. 1 is a longitudinal cross section of a trap embodying my invention, the trap being shown in set or cocked position.

Fig. 2 is a transverse section taken approximately on the line 2—2 in Fig. 1.

Fig. 3 is a longitudinal cross section similar to Fig. 1, but showing the trap in sprung or fired position.

Fig. 4 is a transverse cross section taken on the line 4—4 in Fig. 3.

In the drawings I have shown by way of example one embodiment of my invention. The trap shown in the drawings comprises a hollow cylindrical housing or socket member 1, which is open at its upper end 2 and is closed at its lower end. The closure for the lower end of the socket may, if desired, be integral with the cylindrical side walls of the socket member, but is shown in the drawings as being a separate cap or plug 3 having a threaded portion 4 engaging corresponding threads at the lower end of the side walls so that the closure can be screwed onto the body portion of the socket member during assembly of the trap, and can if desired be subsequently unscrewed when disassembling the trap, for example for inspection or repair. A removable pin 5 is shown extending transversely through the socket member and engaging notches 6 in the upper end of the closure 3 to prevent the closure from being accidentally unscrewed. The closure 3 forming the lower end of the socket member is shown as being tapered or pointed to facilitate the trap being driven into the ground. One or both ends of the pin may be allowed to project beyond the outer wall of the socket member to act as an anchoring means, increasing the resistance of the trap against removal from the ground. Near its upper end the socket member 1 is provided with an internal annular recess 7 formed by an annular external bulge 8 in the side walls of the socket member. Although the recess is located near the upper end of the socket member it is spaced therefrom, the internal diameter of the upper end of the socket member being again restricted to form an upper abutment 2a, while the lower edge of the recess forms a lower abutment 2b.

In the socket member 1 there is provided a cylindrical retainer 9 which is longitudinally movable relative to the socket member. The retainer 9 is hollow and is open at both ends, the internal diameter of the upper end being reduced to provide a small opening 10. The upper end of the retainer projects from the open upper end of the socket member 1 and is provided with a cartridge chamber 11, which is attached to the body portion of the retainer in such a way that it can be removed or opened for insertion of a cartridge 12. For example, the upper end of the retainer and the lower end of the cartridge chamber can be provided with complementary threads as shown in the drawings, so that the chamber can be screwed onto the upper end of the body portion of the retainer. An internal shoulder 13 on the cartridge chamber is adapted to engage the rim of the cartridge to hold the latter firmly in the chamber. The cartridge case of a fired cartridge is removed from the chamber by unscrewing the cartridge chamber 11 from the retainer. A new cartridge can thereupon be inserted in the cartridge chamber and the latter screwed back on the body portion of the retainer 9. The cartridge chamber also serves as a bait holder for the trap and for this purpose is provided at its upper end with a flange 14 for retaining the bait.

The retainer 9 contains a firing pin 15 having an enlarged central portion 16 which slidably engages the inner wall of the retainer. At its upper end the firing pin is provided with a reduced portion 17 ending in a tapered nose 18 adapted to pass through the opening 10 in the upper end of the retainer to strike and discharge a cartridge held in the cartridge chamber 11. A curved shoulder 19 is formed at the junction of the reduce portion 17 with the enlarged central portion 16 of the firing pin. The lower end of the firing pin is also of reduced diameter forming a shoulder 20. A compression spring 21 encircles the reduced lower end 22 of the firing pin, one end of the spring bearing against the shoulder 20 and the other bearing on a removable threaded plug 23, which closes the lower end of the retainer 9. It will be seen that the spring 21 exerts an upwardly directed force on the firing pin tending to move it from the cocked position shown in Fig. 1 to the position shown in Fig. 3 in which the firing pin has struck and discharged the cartridge.

It will be seen from the above description that the firing pin 15 is movable longitudinally inside the retainer 9 and the retainer is in turn movable longitudinally within the socket member 1. In accordance with my invention the retainer is provided with latch mechanism which serves the dual function of releasably holding the firing pin in cocked position and releasably limiting the longitudinal movement of the retainer relative to the socket member. The side walls of the retainer 9 are provided with one or more radially extending holes or openings 24. These holes are spaced from the upper end of the retainer and are so positioned that they register with the annular recess 7 of the socket member when the retainer is in its upper position, as illustrated in Fig. 3. A detent element 25, shown in the form of a spherical ball, is provided in each of the openings 24. The balls 25 fit loosely in the holes 24 and are retained therein only by engagement with the socket member 1 and firing pin 15, as described below. The radius of the balls is approximately equal to or slightly less than the thickness of the cylindrical side wall of the retainer 9 so that the balls protrude from one or the other side of the wall, being movable from an inner position illustrated in Figs. 1 and 2, to an outer position shown in Figs. 3 and 4. In their inner positions, the balls engage the curved shoulder 19 of the firing pin, the radius of this shoulder being approximately equal to the radius of the balls. The engagement of the balls with the shoulder 19 holds the firing pin in cocked position, the balls being held against outward movement by engagement with the inner surface of the side walls of the socket member 1. Inward movement of the balls is prevented not only by their engagement with the shoulder 19, but also by the reduced portion 17 of the firing pin which is of such diameter that the space between the reduced portion 17 of the firing pin and the inner walls of the retainer 9 is less than the diameter of the balls, and is preferably approximately equal to or slightly less than the radius of the balls. Hence, even if the firing pin 15 is pressed downwardly so that the shoulder 19 does not engage the balls, the balls are nevertheless retained in the openings 24 by their engagement with the reduced portion 17 of the firing pin and with the inner wall surface of the socket member. In their outer positions (Figs. 3 and 4) the spherical detent elements 25 engage in the annular recess 7 of the socket member 1 and thereby hold the retainer 9 against movement relative to the socket member. Inner movement of the balls is prevented by their engagement with the enlarged portion 16 of the firing pin. As shown in the drawing the cross sectional radius of the recess 7 is approximately equal to the radius of the balls, so that when the balls are in their outer position the retainer is positively held against longitudinal movement in either direction.

The operation of the trap will be apparent from the foregoing description of the parts. In the set position of the trap shown in Fig. 1, the firing pin 15 is held in cocked position against the action of its spring 21 by engagement of the spherical detent members 25 with the curved shoulder 19 of the firing pin. It will be seen that the spring pressed firing pin acting through the curved shoulders 19 engaging the balls, tends to move the balls outwardly, but that in this position of the trap outward movement is prevented by engagement of the balls with the inner wall surface of the socket member 1. The trap isسprung by pulling outwardly on the cartridge chamber 11 to cause the retainer 9 to move upwardly relative to the socket member, until the holes 24 containing the balls 25 register with the annular recess 7 of the socket member. The balls 25 are thereupon permitted to move outwardly into the recess 7 (Figs. 3 and 4) thereby moving out of the path of the firing pin and releasing the firing pin, which, under the action of its spring 21, is moved rapidly upwardly, causing the nose 18 of the upper reduced portion 17 to pass through the opening 10 and strike the percussion cap or rim of the cartridge held in the cartridge chamber 11.

The outward movement of the balls 25 into the recess 7 locks the retainer in its outer position (Fig. 3) and positively prevents further upwardly movement of the retainer 9. The retainer is thereby prevented from being completely withdrawn from the socket member. Moreover, as long as the firing pin is in its upper or fired position, as shown in Fig. 3, the retainer 9 is also locked against downward movement, being positively held in its upper position. This serves as a visual indication that the trap has been sprung even though the cartridge, through some defect, may have failed to fire. By referring to Fig. 3 it will be seen that the balls are held in their outer position by engagement with the enlarged central portion 16 of the firing pin 15, so that the retainer is positively held against movement in either direction.

The trap is reset by removing the cartridge case of the fired cartridge and pressing downwardly on the firing pin 15 by means of a setting tool having a slender shaft small enough to pass through the opening 10 and a concave end adapted to engage the nose 18 of the firing pin. When downward pressure is applied to the firing pin the retainer 9 is held against downward movement relative to the socket member 1, until the shoulder 19 of the firing pin has passed the holes 24 containing the detent elements 25, i. e., until the firing pin has reached its cocked position. By reason of this automatic locking of the retainer during the initial portion of the setting operation it is unnecessary to hold the retainer manually while forcing the firing pin downwardly relative to the retainer. As soon as the shoulder 19 of the firing pin has moved past the opening 24 the balls 25 contained in the openings move inwardly and lock the firing pin in its cocked position while simultaneously releasing the retainer for downward movement relative to the socket member 1. The retainer and the firing pin thereupon move downwardly together to the position shown in Fig. 1. It will thus be seen that the resetting of the trap is easily and quickly accomplished by merely pushing downwardly on the firing pin. When, as is ordinarily the case, the socket member 1 is inserted in the ground the setting of the trap is a one-hand operation.

As explained above the detents 25 hold the firing pin in cocked position until released by upward movement of the retainer 9, and upon release of the firing pin the detent members lock the retainer against further upward movement and prevent its being pulled all the way out of the socket member 1. The detent members 25 are thus movable from an inner position (Figs. 1 and 2) in which they prevent relative movement of the firing pin and the retainer to an outer position (Figs. 3 and 4) in which they prevent relative movement of the retainer and the socket member.

While accidental withdrawal of the retainer from the socket member is prevented by this dual operation of the detent members 25, the retainer and its associated parts can, if desired, be readily disassembled from the socket member for purposes of inspection, cleaning or servicing. Starting with the parts in the position shown in Fig. 3, this is accomplished by pressing downwardly on the firing pin 15 by means of the setting tool, while simultaneously pulling upwardly on the cartridge chamber of the retainer 9. The downward pressure on the firing pin brings the reduced portion 17 opposite the openings 24, permitting the balls 25 to move inwardly and thereby releasing the retainer from the socket member 1. The retainer 9 can thereupon be removed upwardly from the socket member. If further disassembly of the trap is desired the plug 23 is unscrewed from the lower end of the retainer 9, permitting the removal of the firing pin 15 and its spring 21. In reassembling the trap the firing pin 15, spring 21 and plug 23 are first put back into the retainer 9 and the retainer is inserted in the upper open end of the socket member 1 and is slid downwardly into the socket member until the openings 24 are just above the upper end 2 of the socket member. The balls 25 are then inserted in the openings 24 and downward pressure is inserted on the firing pin 15 by means of the setting tool. This presses the firing pin down to its cocked position so that the balls 25 are permitted to move inwardly to the position shown in Fig. 2, whereupon the retainer 9 and firing pin 15 move downwardly together into the socket member. The trap is thus easily and quickly reassembled.

In using the trap the pointed socket member 1 is pushed or driven into the ground, and then preferably turned so that the projecting end of pin 5 will bite into the earth and act as an anchoring means for the socket member. The trap is cocked or set by pushing downwardly on the firing pin with the setting tool, a cartridge 12 is inserted in the cartridge chamber 11, and suitable bait, for example, a piece of meat, is secured in position around the cartridge chamber. When an animal such as a coyote sees the bait and pulls upwardly on it, the retainer 9 is raised to the position where the openings 24 are in register with the recess 7 of the socket member, whereupon the spherical bodies 25 move outwardly in the recess 7 and the firing pin is released to discharge the cartridge. Upon release of the firing pin the retainer 9 is locked against further longitudinal movement relative to the socket member 1, and cannot be pulled out of the socket or be pushed down into the socket until the firing pin is depressed as described above.

It will be seen from the above description that the trap according to my invention is of simple, yet rugged construction, is simple and reliable in its operation, and can be easily and quickly disassembled and reassembled for inspection and servicing. While my invention has been described wtih reference to the particular embodiment shown by way of example in the drawing, it will be understood that the invention is not limited to the details of the specific construction illustrated.

What I claim and desire to secure by Letters Patent is:

1. In a trap gun, the combination with a cylindrical socket member open at one end and having a recess in its inner surface and spaced from said open end, a cylindrical retainer longitudinally movable in said socket member and having at one end a cartridge chamber and a bait holder extending beyond the open end of said socket member, a firing pin reciprocable in said retainer and adapted to fire a cartridge held in said cartridge chamber, and a spring for actuating said firing pin, of a detent carried by said retainer and movable readily thereof between an inner position in which said detent engages the firing pin to hold said pin in cocked position, and in an outer position in which said detent engages in said recess of said socket member to hold said retainer against longitudinal movement relative to said socket member in either direction.

2. In a trap gun, the combination with a cylindrical socket member open at one end and having an internal recess spaced from said open end, a hollow retainer longitudinally slidable in said socket member and having at one end a cartridge chamber and a bait holder extending beyond the open end of said socket member, said retainer having in its side wall an opening adapted to open into said recess of the socket member when the retainer is partially withdrawn from the socket member, a detent element loosely confined in said opening, a firing pin longitudinally movable in said retainer and adapted to fire a cartridge held in said cartridge chamber, and a spring for moving said firing pin from a cocked position to a fired position, said firing pin having a reduced portion adapted to engage said detent element to retain it in said opening with the firing pin in cocked position, and an enlarged portion adapted to engage said detent element to retain it in said opening and recess when the firing pin is in fired position.

3. In a trap gun, the combination with a cylindrical socket member open at one end and having a recess in its inner surface and spaced from said open end, a cylindrical retainer longitudinally movable in said socket member and having at one end a cartridge chamber and a bait holder extending beyond the open end of said socket member, a firing pin reciprocable in said retainer and adapted to fire a cartridge held in said cartridge chamber, and a spring for actuating said firing pin, of a detent for holding said firing pin in cocked position, said detent being associated with said retainer and being movable into said recess in the socket member to release the firing pin upon predetermined movement of the retainer relative to said socket member, said firing pin having an enlarged portion engaging said detent when said pin is in fired position to hold said detent in said recess and thereby lock said retainer against movement in either direction relative to said socket member.

4. In a trap gun, the combination with a cylindrical socket member open at one end and having a recess in its inner surface at a position spaced from said open end and providing upper and lower abutments, a cylindrical retainer longitudinally movable in said socket member and having at one end a cartridge holder extending beyond the open end of said socket member, a firing pin reciprocable in said retainer between a set position and a sprung position and adapted to fire a cartridge held by said cartridge holder, and a spring for actuating the firing pin, of a detent carried by said retainer and movable radially thereof between an inner position in which said detent engages the firing pin to hold it in cocked position and an outer position in which said detent engages in said recess of the socket member to hold the retainer against longitudinal movement relative to the socket member, said firing pin having a portion thereof in engagement with the detent to hold the detent within the retainer and in the recess in sprung position.

5. In a trap gun, the combination with a cylindrical socket member having a recess providing an abutment positioned adjacent the end thereof, a cylindrical retainer longitudinally movable in said socket member and provided at one end with a cartridge chamber, the retainer adapted to be moved out of the socket member, a firing pin reciprocable in said retainer and adapted to fire a cartridge held in said cartridge chamber, and a spring for actuating the firing pin, said firing pin being movable against the force of its spring from fired position to set position and having an elongated cylindrical portion closely fitting inside the cylindrical retainer, a reduced upper portion and a shoulder between said two portions, of a detent carried by said retainer and movable radially thereof between an inner position in which said detent engages said shoulder of the firing pin to hold it in cocked position and an outer position in which said detent engages said abutment of the socket member, the elongated portion of the firing pin being of such length and diameter as to engage the detent when the firing pin is in fired position to lock the detent in engagement with said abutment and thereby hold said retainer against movement longitudinally of the socket member during an initial portion of the setting movement while permitting movement of said firing pin relative to said retainer until said shoulder of the firing pin has passed the detent, said detent being thereupon engageable with said shoulder of the firing pin during a subsequent portion of said setting movement to hold said firing pin in set position while permitting said retainer and the firing pin to move as a unit relative to said socket member, inward movement of the detent being limited by an engagement with said reduced portion of the firing pin.

JOHN U. LEHN.

REFERENCES CITED

The following references are of record in the file of this patent:

UNITED STATES PATENTS

| Number | Name | Date |
|---|---|---|
| 1,512,249 | Sprague | Oct. 21, 1924 |
| 1,792,023 | Macy | Feb. 10, 1931 |
| 2,145,488 | Marlman | Jan. 31, 1939 |
| 2,301,764 | Wainwright | Nov. 10, 1942 |

FOREIGN PATENTS

| Number | Country | Date |
|---|---|---|
| 275,265 | Germany | June 12, 1914 |